(12) United States Patent
Mukobara et al.

(10) Patent No.: US 11,211,624 B2
(45) Date of Patent: Dec. 28, 2021

(54) FUEL CELL SYSTEM

(71) Applicant: DENSO CORPORATION, Kariya (JP)

(72) Inventors: Yuki Mukobara, Kariya (JP);
Takayuki Sugiura, Kariya (JP);
Yasuhiro Osada, Kariya (JP);
Yasutoshi Doi, Kariya (JP); Atsushi Hayasaka, Kariya (JP); Takahiro Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 16/573,700

(22) Filed: Sep. 17, 2019

(65) Prior Publication Data

US 2020/0014047 A1 Jan. 9, 2020

Related U.S. Application Data

(63) Continuation of application No. PCT/JP2018/018863, filed on May 16, 2018.

(30) Foreign Application Priority Data

May 18, 2017 (JP) .............................. JP2017-099070
Apr. 6, 2018 (JP) .............................. JP2018-073759

(51) Int. Cl.
*H01M 8/0612* (2016.01)
*H01M 8/0662* (2016.01)
(Continued)

(52) U.S. Cl.
CPC .............. *H01M 8/0618* (2013.01); *C01B 3/38* (2013.01); *H01M 8/04022* (2013.01);
(Continued)

(58) Field of Classification Search
CPC ........... H01M 8/0618; H01M 8/04022; H01M 8/04164; H01M 8/04402; H01M 8/04447;
(Continued)

(56) References Cited

U.S. PATENT DOCUMENTS

| 2008/0152972 A1* | 6/2008 | Igarashi | ............ | H01M 8/04402 |
|---|---|---|---|---|
| | | | | 429/410 |
| 2011/0165486 A1* | 7/2011 | Hottinen | ........... | H01M 8/04097 |
| | | | | 429/431 |

(Continued)

FOREIGN PATENT DOCUMENTS

| JP | 2003109628 A | 4/2003 |
|---|---|---|
| JP | 2003-288920 A | 10/2003 |

(Continued)

*Primary Examiner* — Matthew J Merkling
(74) *Attorney, Agent, or Firm* — Harness, Dickey & Pierce, P.L.C.

(57) ABSTRACT

A fuel cell system includes a fuel cell, a fuel gas supply line, an oxidizing agent gas supply line, a fuel gas discharge line, and a reformer provided in the fuel gas supply line. A first circulating line circulates the fuel gas from the fuel gas discharge line to an upstream side of the reformer in the fuel gas supply line as a first circulating gas. The circulation device is provided in the fuel gas supply line, and suctions the first circulating gas by using the flow of the fuel gas flowing through the fuel gas supply line as a driving flow. A second circulating line circulates the fuel gas from a downstream side of the circulation device in the fuel gas supply line or the fuel gas discharge line to the upstream side of the circulation device in the fuel gas supply line as a second circulating gas.

5 Claims, 11 Drawing Sheets

(51) Int. Cl.
| | |
|---|---|
| *H01M 8/04014* | (2016.01) |
| *H01M 8/04119* | (2016.01) |
| *H01M 8/0438* | (2016.01) |
| *H01M 8/04537* | (2016.01) |
| *H01M 8/04746* | (2016.01) |
| *H01M 8/0444* | (2016.01) |
| *C01B 3/38* | (2006.01) |

(52) U.S. Cl.
CPC ... *H01M 8/04164* (2013.01); *H01M 8/04402* (2013.01); *H01M 8/04447* (2013.01); *H01M 8/04462* (2013.01); *H01M 8/04552* (2013.01); *H01M 8/04761* (2013.01); *H01M 8/0675* (2013.01); *C01B 2203/0233* (2013.01); *C01B 2203/0261* (2013.01); *C01B 2203/067* (2013.01); *C01B 2203/1241* (2013.01)

(58) Field of Classification Search
CPC ......... H01M 8/04462; H01M 8/04552; H01M 8/04761; H01M 8/0675; C01B 3/38
See application file for complete search history.

(56) References Cited

U.S. PATENT DOCUMENTS

| | | | |
|---|---|---|---|
| 2013/0143136 A1* | 6/2013 | Ukai | H01M 8/0612 429/410 |
| 2014/0322619 A1 | 10/2014 | Lin et al. | |
| 2015/0280265 A1* | 10/2015 | McLarty | H01M 8/04014 429/411 |
| 2016/0149244 A1 | 5/2016 | Abe et al. | |
| 2016/0204454 A1 | 7/2016 | Hakala | |
| 2018/0375131 A1* | 12/2018 | Hauth | H01M 8/04402 |

FOREIGN PATENT DOCUMENTS

| | | |
|---|---|---|
| JP | 2007128680 A | 5/2007 |
| JP | 2013235735 A | 11/2013 |
| JP | 2015179582 A | 10/2015 |
| JP | 2016104686 A | 6/2016 |
| JP | 2016-130191 A | 7/2016 |
| JP | 2016192334 A | 11/2016 |
| WO | WO-2014/179046 A1 | 11/2014 |
| WO | WO-2015/029886 A1 | 3/2015 |

* cited by examiner

FUEL CELL SYSTEM

CROSS REFERENCE TO RELATED APPLICATIONS

This application is a continuation application of International Patent Application No. PCT/JP2018/018863 filed on May 16, 2018, which designated the U.S. and based on and claims the benefits of priority of Japanese Patent Application No. 2017-99070 filed on May 18, 2017, and Japanese Patent Application No. 2018-73759 filed on Apr. 6, 2018. The entire disclosure of all of the above applications is incorporated herein by reference.

TECHNICAL FIELD

The present disclosure relates to a fuel cell system.

BACKGROUND

In order to improve the efficiency of the fuel cell system, a technology for circulating fuel gas has been proposed.

SUMMARY

In one aspect of the present disclosure, a fuel cell system includes a fuel cell having an anode flow channel and a cathode flow channel, a fuel gas supply line configured to supply a fuel gas to the anode flow channel, and an oxidizing agent gas supply line configured to supply a oxidizing agent gas to the cathode flow channel, a fuel gas discharge line through which the fuel gas discharged from the anode flow channel flows, and a reformer provided in the fuel gas supply line to reform the fuel gas. A first circulating line is configured to circulate the fuel gas from the fuel gas discharge line to an upstream side of the reformer in the fuel gas supply line as a first circulating gas. A circulation device is provided in the fuel gas supply line and is configured to suction the first circulating gas by using the flow of the fuel gas flowing through the fuel gas supply line as a driving flow. A second circulating line is configured to circulate the fuel gas from a downstream side of the circulation device in the fuel gas supply line or the fuel gas discharge line to the upstream side of the circulation device in the fuel gas supply line as a second circulating gas.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

First Embodiment

Embodiments of a fuel cell system will be described with reference to the drawings.

Figure 1:
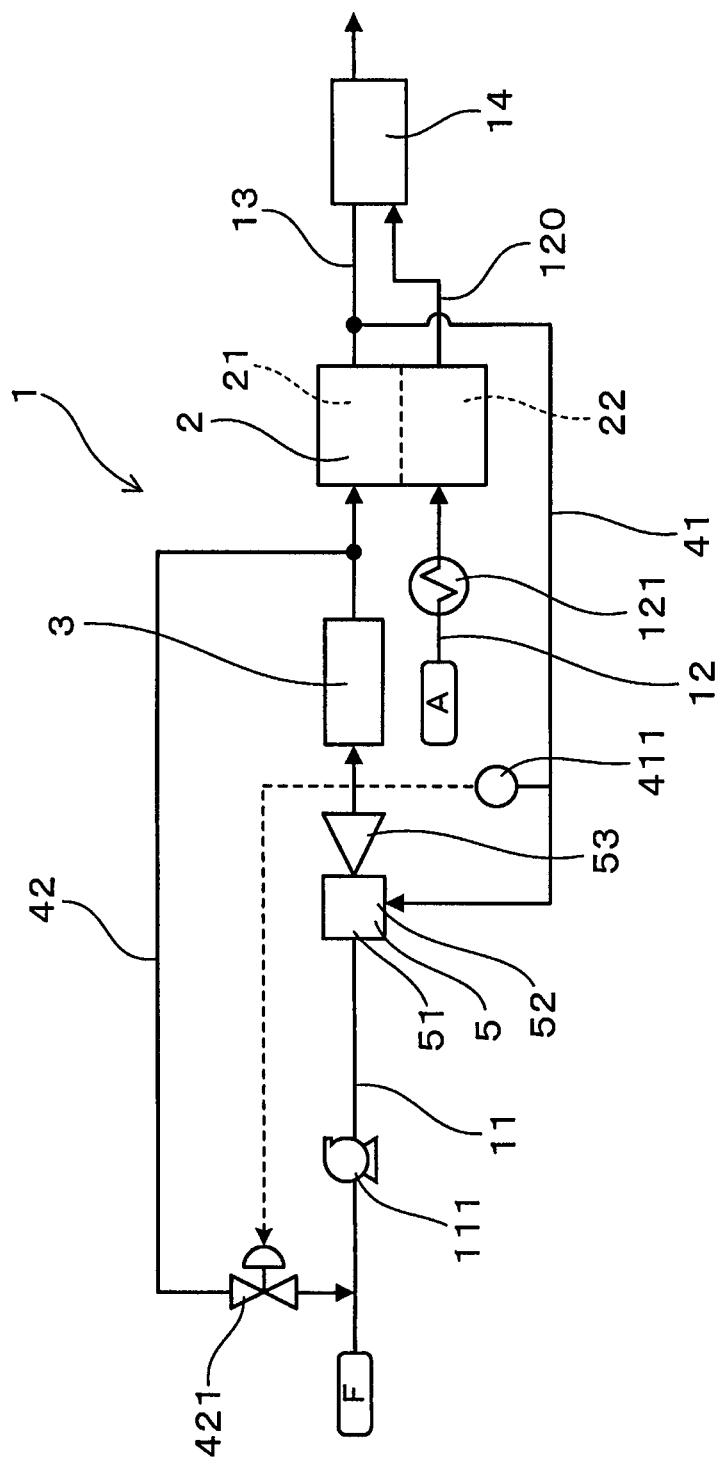
FIG. 1 is an explanatory view of a fuel cell system according to a first embodiment.

As shown in FIG. 1, the fuel cell system 1 according to the present embodiment includes a fuel cell 2, a fuel gas supply line 11, an oxidizing agent gas supply line 12, a fuel gas discharge line 13, a reformer 3, a first circulating line 41, an ejector 5 as a circulation device, and a second circulating line 42.

The fuel cell 2 has an anode flow channel 21 and a cathode flow channel 22. The fuel gas supply line 11 supplies the fuel gas to the anode flow channel 21. The oxidizing agent gas supply line 12 supplies oxidizing agent gas to the cathode flow channel 22. The fuel gas discharged from the anode flow channel 21 flows through the fuel gas discharge line 13. The reformer 3 is provided in the fuel gas supply line 11 to reform the fuel gas. The first circulating line 41 circulates the fuel gas from the fuel gas discharge line 13 to the upstream side than the reformer 3 in the fuel gas supply line 11 as a first circulating gas. The ejector 5 is provided in the fuel gas supply line 11. The ejector 5 sucks the first circulating gas by using the flow of the fuel gas flowing through the fuel gas supply line 11 as a driving flow. The second circulating line 42 circulates the fuel gas from the fuel gas supply line 11 on the downstream side than the reformer 3 to the upstream side of the ejector 5 in the fuel gas supply line 11 as a second circulating gas.

The fuel cell system 1 of the present embodiment generates electric power by causing hydrogen contained in the fuel gas reformed in the reformer 3 and oxygen contained in the oxidant gas to react in the fuel cell 2. The fuel cell 2 has an electrolyte member disposed between the anode flow channel 21 and the cathode flow channel 22. In the present embodiment, a solid oxide fuel cell (i.e., SOFC) using solid oxide ceramics as the electrolyte member can be used as the fuel cell 2.

In the fuel gas supply line 11, the reformer 3 and the ejector 5 disposed on the upstream side of the reformer 3. Further, on the upstream side of the ejector 5 in the fuel gas supply line 11, a blower 111 for feeding the fuel gas to the ejector 5 is provided. The fuel gas F before reforming is introduced from the upstream end of the fuel gas supply line 11. Further, the second circulating gas is introduced from the second circulating line 42 into the fuel gas supply line 11 on the upstream side than the blower 111. The fuel gas F mixed with the second circulating gas is sent to the ejector 5 by the blower 111.

The fuel gas sent to the ejector 5 becomes a driving flow. Then, the fuel gas is sent to the reformer 3 together with the first circulating gas sucked as a suction flow in the ejector 5. The fuel gas is reformed in the reformer 3 into a fuel gas containing hydrogen. The reformed fuel gas is supplied to the anode flow channel 21 of the fuel cell 2.

As the fuel gas F before reforming, for example, methane which is a kind of hydrocarbon can be used.

The ejector 5 has a nozzle portion 51, a suction portion 52, and a discharge portion 53. The nozzle portion 51 injects the fuel gas introduced from the upstream side of the fuel gas supply line 11 as the driving flow. The suction portion 52 sucks the first circulating gas from the first circulating line 41 as a suction flow by the driving flow injected from the nozzle portion 51. The discharge portion 53 discharges a mixed flow obtained by mixing the driving flow and the suction flow to the downstream side of the fuel gas supply line 11.

In the oxidizing agent gas supply line 12, a preheater 121 for preheating the oxidant gas introduced into the fuel cell 2 is provided. As a result, the oxidizing agent gas A introduced from the upstream end of the oxidizing agent gas supply line 12 is heated by the preheater 121 so as to raise its temperature. The heated oxidizing agent gas is supplied from the oxidizing agent gas supply line 12 to the cathode flow channel 22 of the fuel cell 2. For example, air can be used as the oxidizing agent gas.

As described above, hydrogen in the fuel gas introduced into the anode flow channel 21 and oxygen in the oxidizing agent gas introduced into the cathode flow channel 22 react in the fuel cell 2 so as to generate electric power. Then, the fuel gas discharged from the anode flow channel 21 and the oxidizing agent gas discharged from the cathode flow channel 22 are introduced into a combustor 14 through the fuel gas discharge line 13 and the oxidizing agent gas discharge line 120, respectively. The fuel gas discharged from the fuel cell 2 contains water vapor generated by the reaction and hydrogen not used for the reaction. Further, the oxidizing agent gas discharged from the fuel cell 2 contains oxygen which has not been used for the reaction. These hydrogen and oxygen react and burn in the combustor 14. The combustion gas after combustion is discharged from the combustor 14.

One end of the first circulating line 41 is connected to the fuel gas discharge line 13. Then, the other end of the first circulating line 41 is connected to the suction portion 52 of the ejector 5. Thereby, a part of the fuel gas discharged from the anode flow channel 21 to the fuel gas discharge line 13 is circulated from the ejector 5 to the upstream side than the reformer 3 in the fuel gas supply line 11 as the first circulating gas via the first circulating line 41. As described above, the first circulating gas that is also a part of the fuel gas of the fuel gas discharge line 13 contains water vapor and hydrogen. Therefore, the first circulating gas is mixed with the fuel gas before reforming in the ejector 5, and the hydrogen contained therein is supplied to the anode flow channel 21 and is used as a fuel. Further, the water vapor contained in the first circulating gas is used to reform the fuel gas in the reformer 3.

Further, one end of the second circulating line 42 is connected to the downstream side of the reformer 3 in the fuel gas supply line 11. The other end of the second circulating line 42 is connected to the upstream side than the blower 111 in the fuel gas supply line 11. Further, in the second circulating line 42, a flow rate control unit 421 that controls the flow rate of the second circulating gas is provided.

The fuel gas reformed by the reformer 3 is circulated from the second circulating line 42 to the upstream side of the blower 111 in the fuel gas supply line 11 as the second circulating gas. As described above, the second circulating gas is introduced as a driving flow into the ejector 5 by the blower 111 together with the fuel gas F before reforming. Therefore, the mass flow rate of the driving flow can be increased. As a result, a large amount of the first circulating gas can be sucked as the suction flow of the ejector 5. That is, the circulation rate of the first circulating gas can be increased.

Further, the flow rate control unit 421 can appropriately control the flow rate of the second circulating gas. The flow rate control unit 421 can adjust the driving flow for the ejector 5, so that the flow rate of the first circulating gas can be adjusted. For example, when the desired power generation amount is large, the opening degree of the flow rate control unit 421 is increased to increase the mass flow rate of the second circulating gas, and the circulation rate of the first circulating gas is increased. On the other hand, when the desired amount of power generation is small, the opening degree of the flow rate control unit 421 is reduced to reduce the mass flow rate of the second circulating gas, thereby decreasing the circulation rate of the first circulating gas.

As shown in FIG. 1, the first circulation flow rate detection unit 411 may be provided in the first circulating line 41 that detects the flow rate of the first circulating gas. In this case, the opening degree of the flow rate control unit 421 can be adjusted based on the circulation flow rate of the first circulating gas detected by the first circulation flow rate detection unit 411.

In addition, the flow rate control unit 421 may be configured to be able to stop the circulation of the second circulating gas. Further, the flow rate control unit 421 may be configured, for example, such that only the opening and closing can be controlled, and only the two-stage control of whether or not to circulate the second circulating gas can be performed.

The present embodiment provides the following functions and advantages.

The fuel cell system 1 has a first circulating line 41 and a second circulating line 42. The second circulating line 42 can circulate the fuel gas on the downstream side than the ejector 5 as the second circulating gas, and merge with the upstream side than the ejector 5 in the fuel gas supply line 11. Thereby, the mass flow rate of the fuel gas sent to the ejector 5 as the driving flow can be increased. As a result, it is possible to increase the amount of the first circulating gas that is sucked into the ejector 5 as the suction flow.

On the other hand, the second circulating gas circulating in the second circulating line 42 circulates in the form of gas and is joined to the upstream side of the ejector 5. Therefore, it is not necessary to provide an evaporator etc. in the second circulating line 42 especially, and the energy for evaporation is not required in particular.

As a result, it is possible to simplify the system and improve the power generation efficiency.

Further, in the second circulating line 42, a flow rate control unit 421 that controls the flow rate of the second circulating gas is provided. Thus, as described above, the flow rate of the second circulating gas can be adjusted, and the circulation rate of the first circulating gas can be adjusted.

In addition, the second circulating line 42 is configured to circulate the fuel gas from the fuel gas supply line 11 between the reformer 3 and the fuel cell 2. As a result, it is possible to circulate the fuel gas immediately after reforming, which contains a large amount of fuel components, as the second circulating gas.

As described above, according to the present embodiment, it is possible to provide a fuel cell system capable of simplifying the system and improving the power generation efficiency.

Second Embodiment

Figure 2:
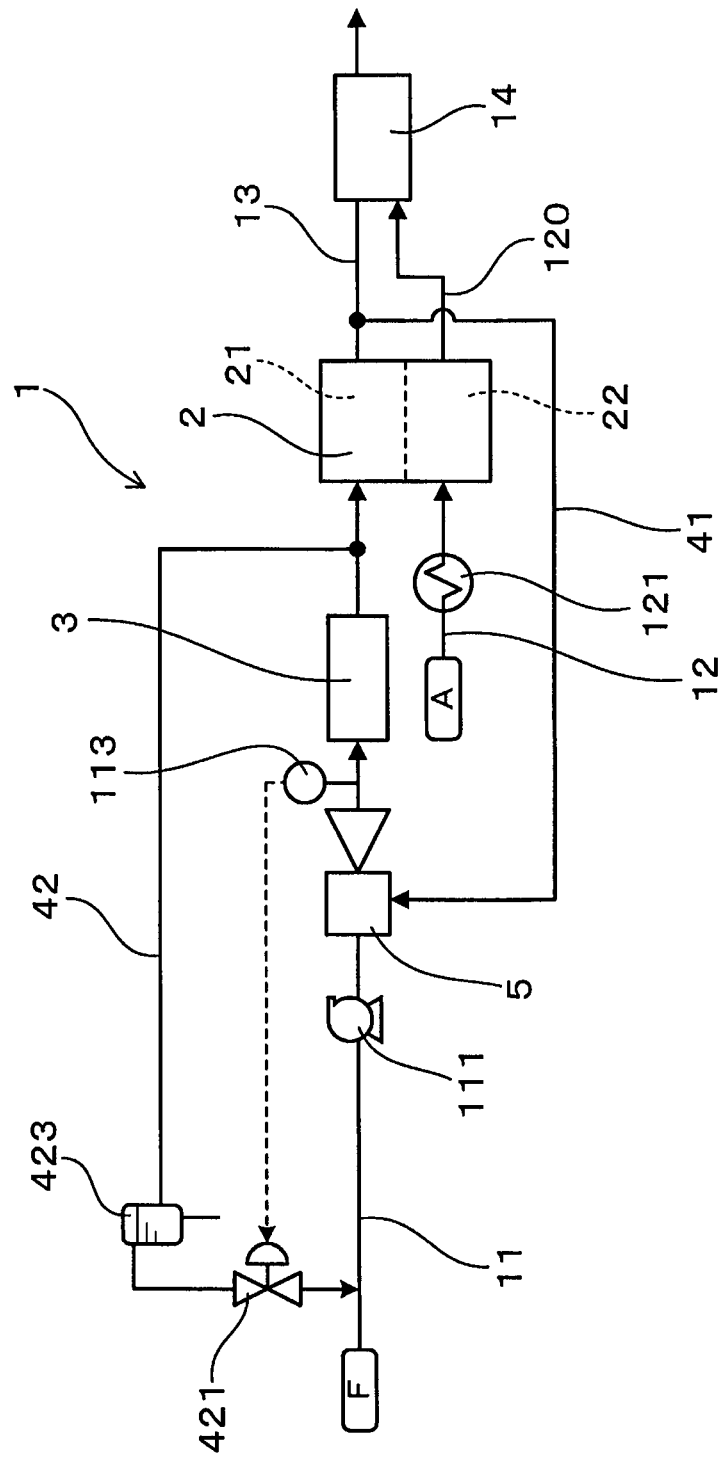
FIG. 2 is an explanatory view of a fuel cell system according to a second embodiment.

In the fuel cell system 1 of the second embodiment, as shown in FIG. 2, a condenser 423 for condensing the water in the second circulating gas is provided in the second circulating line 42.

The condenser 423 is disposed on the upstream side of the flow rate control unit 421. The condenser 423 cools the second circulating gas and condenses the water vapor contained in the second circulating gas into liquid water. Thereby, in the condenser 423, the second circulating gas is separated into liquid water and gas. This gas is a dry fuel gas with a reduced amount of water. Also, this gas is a fuel gas containing hydrogen.

Then, the dry fuel gas as described above is introduced into the fuel gas supply line 11 on the upstream side of the blower 111. That is, the dry fuel gas which is the second circulating gas is mixed with the fuel gas F before reforming in the fuel gas supply line 11. The mixed fuel gas is introduced into the ejector 5 through the blower 111 as the driving flow.

The other configuration is the same as that of the first embodiment.

Incidentally, among reference numerals used in the second and subsequent embodiments, the same reference numerals as those used in the embodiment already described represent the same components as those in the embodiment already described, unless otherwise indicated.

In the second embodiment, the water in the second circulating gas can be removed. As a result, the amount of water in the fuel gas introduced into the ejector 5 as the driving flow can be adjusted. As a result, the amount of water in the fuel gas introduced into the anode flow channel 21 of the fuel cell 2 can be easily adjusted.

Further, in the second embodiment, the fuel gas after reforming is circulated by the second circulating line 42. Therefore, the amount of water in the second circulating gas can be reduced as compared to the case where the fuel gas before reforming is circulated or the case where the fuel gas is circulated from the fuel gas discharge line 13. Therefore, it is possible to suppress a decrease in the mass flow rate of the second circulating gas due to the removal of the water by the condenser 423. As a result, it is easy to ensure the mass flow rate of the fuel gas sent to the ejector 5 as the driving flow.

Further, as shown in FIG. 2, the fuel gas supply line 11 may be provided with a water content detection unit 113 for detecting the water content in the fuel gas. In this case, the opening degree of the flow rate control unit 421 can be adjusted based on the water content detected by the water content detection unit 113. The water content detection unit 113 can be provided in the fuel gas supply line 11 between the ejector 5 and the reformer 3.

In addition, although the first circulation flow rate detection unit 411 shown in FIG. 1 is not shown in FIG. 2, the first circulation flow rate detection unit 411 can be provided also in the second embodiment. In this case, the opening degree of the flow rate control unit 421 is adjusted based on both the flow rate of the first circulating gas detected by the first circulation flow rate detection unit 411 and the water content detected by the water content detection unit 113.

In addition, the second embodiment has the same functions and advantages as in the first embodiment.

Third Embodiment

Figure 3:
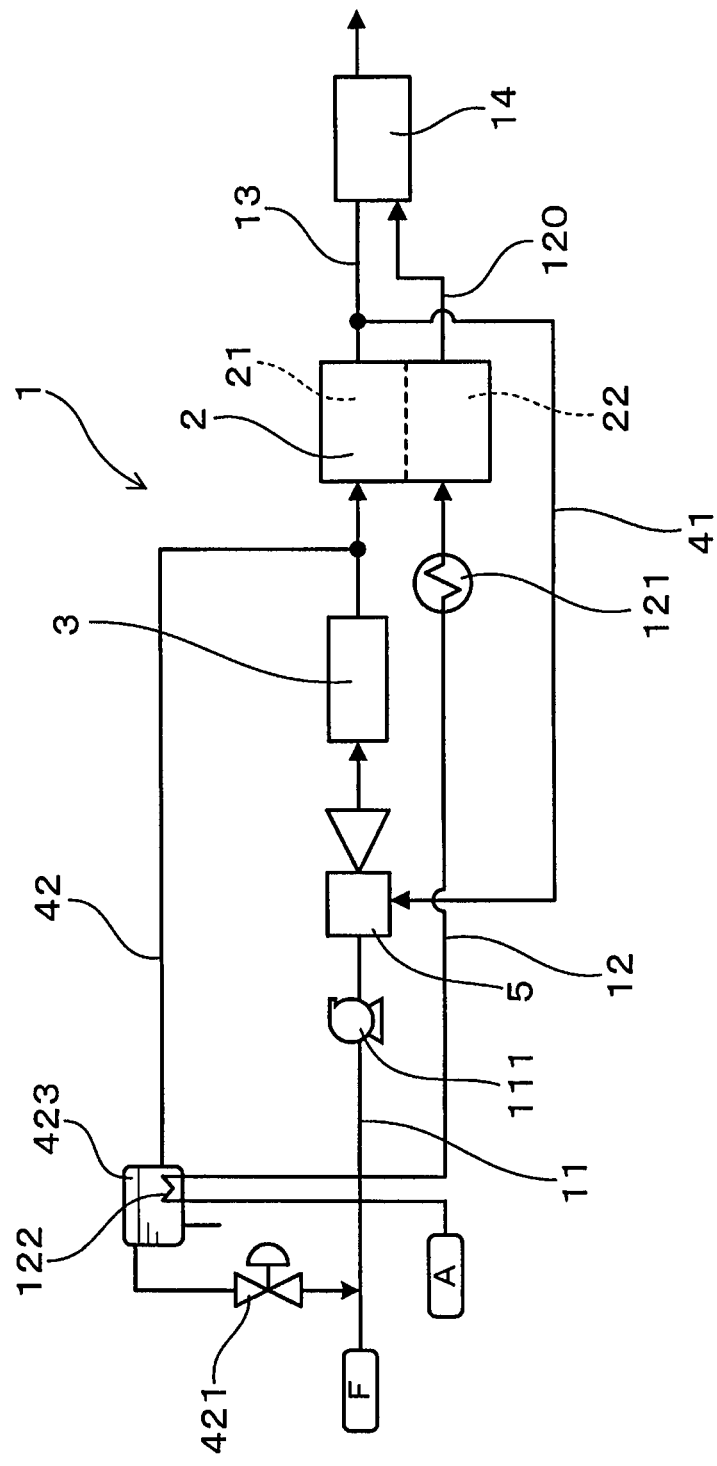
FIG. 3 is an explanatory view of a fuel cell system according to a third embodiment.

As shown in FIG. 3, the fuel cell system 1 of the present embodiment has an oxidant heat exchange unit 122 between the condenser 423 and the oxidizing agent gas supply line 12.

The oxidant heat exchange unit 122 is configured to be able to transfer the condensation heat generated in the condenser 423 to the oxidizing agent gas in the oxidizing agent gas supply line 12.

That is, in the condenser 423, when the water in the second circulating gas condenses, condensation heat is generated. The heat of condensation is transferred to the oxidizing agent gas in the oxidizing agent gas supply line 12 through the oxidant heat exchange unit 122. Therefore, the temperature of the oxidizing agent gas rises. The heated oxidizing agent gas transfers through the oxidizing agent gas supply line 12 to the cathode flow channel 22 of the fuel cell 2. The heated oxidizing agent gas is further heated in the preheater 121 disposed between the oxidant heat exchange unit 122 and the fuel cell 2, and is supplied to the cathode flow channel 22.

The other configuration is the same as that of the first embodiment.

In the third embodiment, the heat of condensation generated in the condenser 423 can be effectively used to raise the temperature of the oxidizing agent gas. Therefore, before the oxidizing agent gas is supplied to the cathode flow channel 22, the thermal energy to be given to the oxidizing agent gas in the preheater 121 can be reduced. The system efficiency can be further improved.

Alternatively, the temperature of the oxidizing agent gas supplied to the cathode flow channel 22 of the fuel cell 2 can be made higher. In this case, the power generation efficiency of the fuel cell 2 can be improved.

Thus, the system efficiency of the fuel cell system 1 can be improved by effectively utilizing the condensation heat generated in the condenser 423 in the fuel cell system 1.

In addition, the third embodiment has the same functions and advantages as in the first embodiment.

Fourth Embodiment

Figure 4:
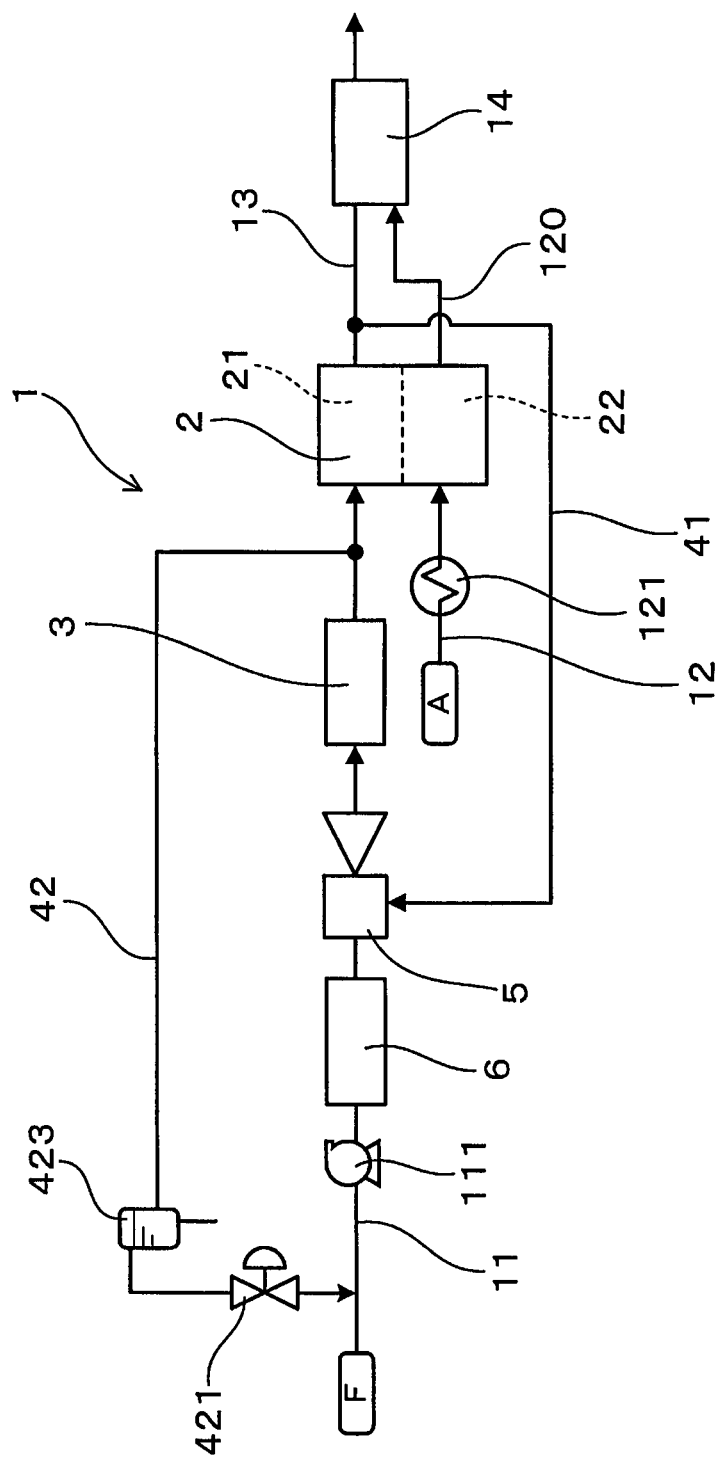
FIG. 4 is an explanatory view of a fuel cell system according to a fourth embodiment.

In the fuel cell system 1 of the fourth embodiment, as shown in FIG. 4, a hydro-desulfurizer 6 is provided in the fuel gas supply line 11.

The hydro-desulfurizer 6 removes the sulfur contained in the fuel gas F by using hydrogen. That is, the hydro-desulfurizer 6 is configured to react sulfur with hydrogen so as to remove sulfur from the fuel gas F.

In general, a sulfur compound is added as an odorant to the city gas or the like used as the fuel gas F, which is a raw material introduced into the fuel gas supply line 11. However, when the sulfur compound is supplied to the reformer 3 and the fuel cell 2 together with the fuel gas, the catalyst of the reformer 3 and the fuel cell 2 may be poisoned. Therefore, it is desirable to remove sulfur from the fuel gas in the fuel gas supply line 11. Therefore, as the desulfurizer for removing the sulfur content, the hydro-desulfurizer 6 for removing the sulfur content by using hydrogen is disposed in the fuel gas supply line 11.

The hydro-desulfurizer 6 is disposed on the upstream side of the ejector 5 in the fuel gas supply line 11. More specifically, the hydro-desulfurizer 6 is provided between the blower 111 and the ejector 5 in the fuel gas supply line 11.

The other configuration is the same as that of the first embodiment.

The second circulating gas is introduced into the fuel gas supply line 11 from the second circulating line 42. As described above, the second circulating gas contains hydrogen. The hydrogen is introduced into the hydro-desulfurizer 6 together with the fuel gas through the fuel gas supply line 11. Then, in the hydro-desulfurizer 6, the sulfur in the fuel gas reacts with hydrogen. Thereby, the sulfur content can be removed from the fuel gas.

In the fourth embodiment, in particular, the second circulating line 42 is configured to circulate the fuel gas from the fuel gas supply line 11 between the reformer 3 and the fuel cell 2 to the upstream side of the hydro-desulfurizer 6 in the fuel gas supply line 11. The second circulating gas is, in particular, a fuel gas containing a large amount of hydrogen. Therefore, the amount of hydrogen introduced into the hydro-desulfurizer 6 can be increased, and effective desulfurization can be performed.

Further, the condenser 423 is disposed in the second circulating line 42, and the second circulating gas becomes a dry fuel gas with a small amount of water. The fuel gas introduced into the hydro-desulfurizer 6 can also be a gas with a small amount of water. Therefore, deterioration of the catalyst of the hydro-desulfurizer 6 can be suppressed, and the durability of the hydro-desulfurizer 6 can be improved.

In addition, the third embodiment has the same functions and advantages as in the first embodiment.

Fifth Embodiment

Figure 5:
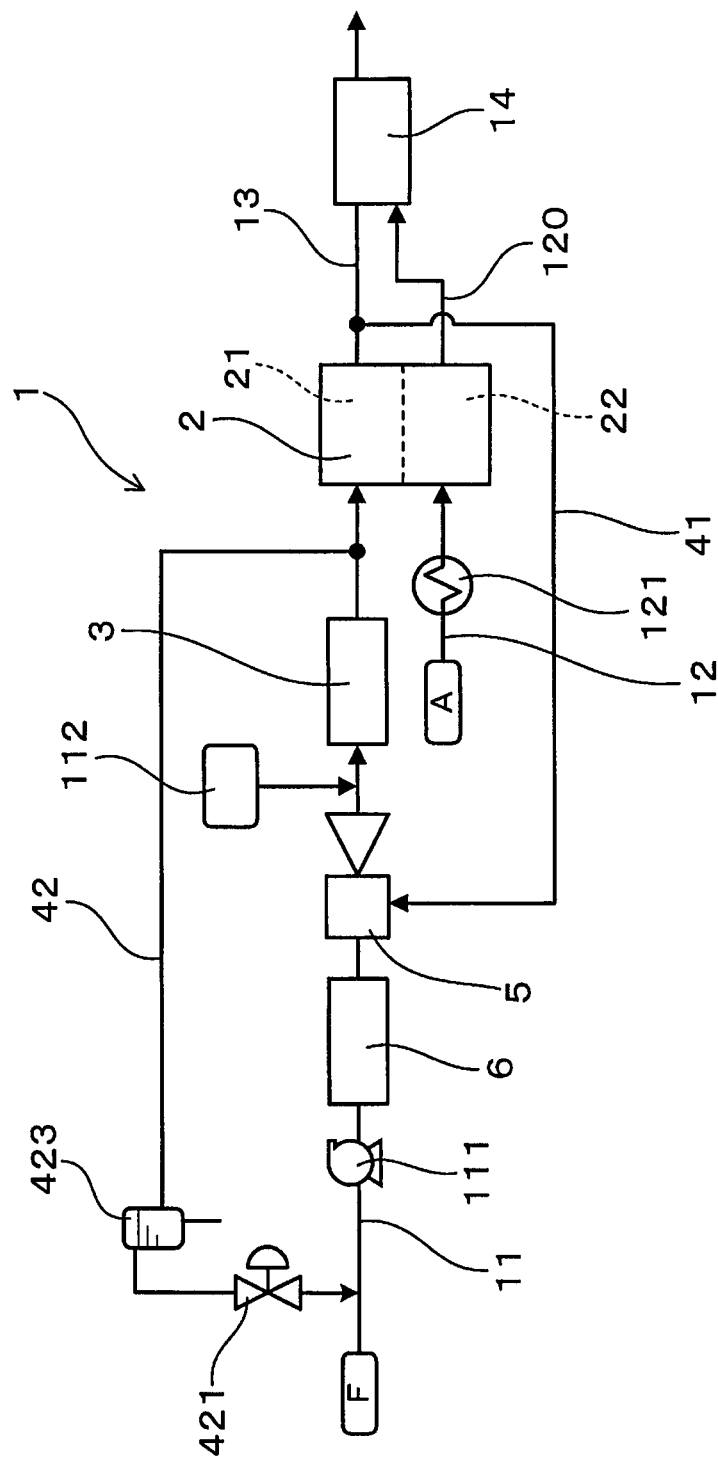
FIG. 5 is an explanatory view of a fuel cell system according to a fifth embodiment.

In the fuel cell system 1 of the fifth embodiment, as shown in FIG. 5, the reformer 3 has a structure capable of obtaining hydrogen by a partial oxidation reforming reaction.

Further, the fuel cell system 1 includes a reforming oxidant supply unit 112 which supplies an oxidizing agent used for the partial oxidation reforming reaction to the upstream side of the reformer 3 in the fuel gas supply line 11.

Partial oxidation reforming reaction is a reaction in which the oxidant is mixed with the fuel gas to reform the fuel gas and hydrogen and carbon monoxide are generated. That is, methane and oxygen are reacted to produce water, and the water and methane react to produce hydrogen and carbon monoxide. At this time, the reaction proceeds without applying heat from the outside.

The oxidant supplied from the reforming oxidant supply unit 112 can be, for example, air.

The reforming oxidant supply unit 112 is provided in the fuel gas supply line 11 between the ejector 5 and the reformer 3. Further, the reformer 3 may be configured to be able to perform both the partial oxidation reforming reaction and the steam reforming reaction.

The other configuration is the same as that of the first embodiment.

In the fifth embodiment, the reformer 3 can obtain hydrogen by the partial oxidation reforming reaction. Therefore, even when the water content of the fuel gas introduced into the reformer 3 is very small, the fuel gas can be reformed and sufficient hydrogen can be generated. In particular, in the case where the fuel cell 2 stops power generation or the like, no moisture is generated in the fuel cell 2. As a result, the water content in the first circulating gas and the second circulating gas also decreases. In such a case, the water content in the fuel gas introduced to the reformer 3 is reduced, and it becomes difficult to sufficiently generate hydrogen by steam reforming. Therefore, hydrogen can be sufficiently obtained because the reformer 3 is configured to generate hydrogen in the partial oxidation reforming reaction. Therefore, hydrogen to be supplied to the hydro-desulfurizer 6 can also be secured.

In addition, when the reformer 3 is configured to be able to perform both the partial oxidation reforming reaction and the steam reforming reaction, the steam reforming reaction is performed at the time of power generation of the fuel cell 2, and the partial oxidation reforming reaction can also be utilized when the fuel cell is not generating electricity.

The reforming oxidant supply unit 112 is provided in the fuel gas supply line 11 between the ejector 5 and the reformer 3. Thus, the oxidizing agent can be efficiently supplied to the reformer 3, and the oxidation of the nozzle portion 51 or the like of the ejector 5 can be suppressed.

In addition, the fifth embodiment has the same functions and advantages as in the first embodiment.

Sixth Embodiment

Figure 6:
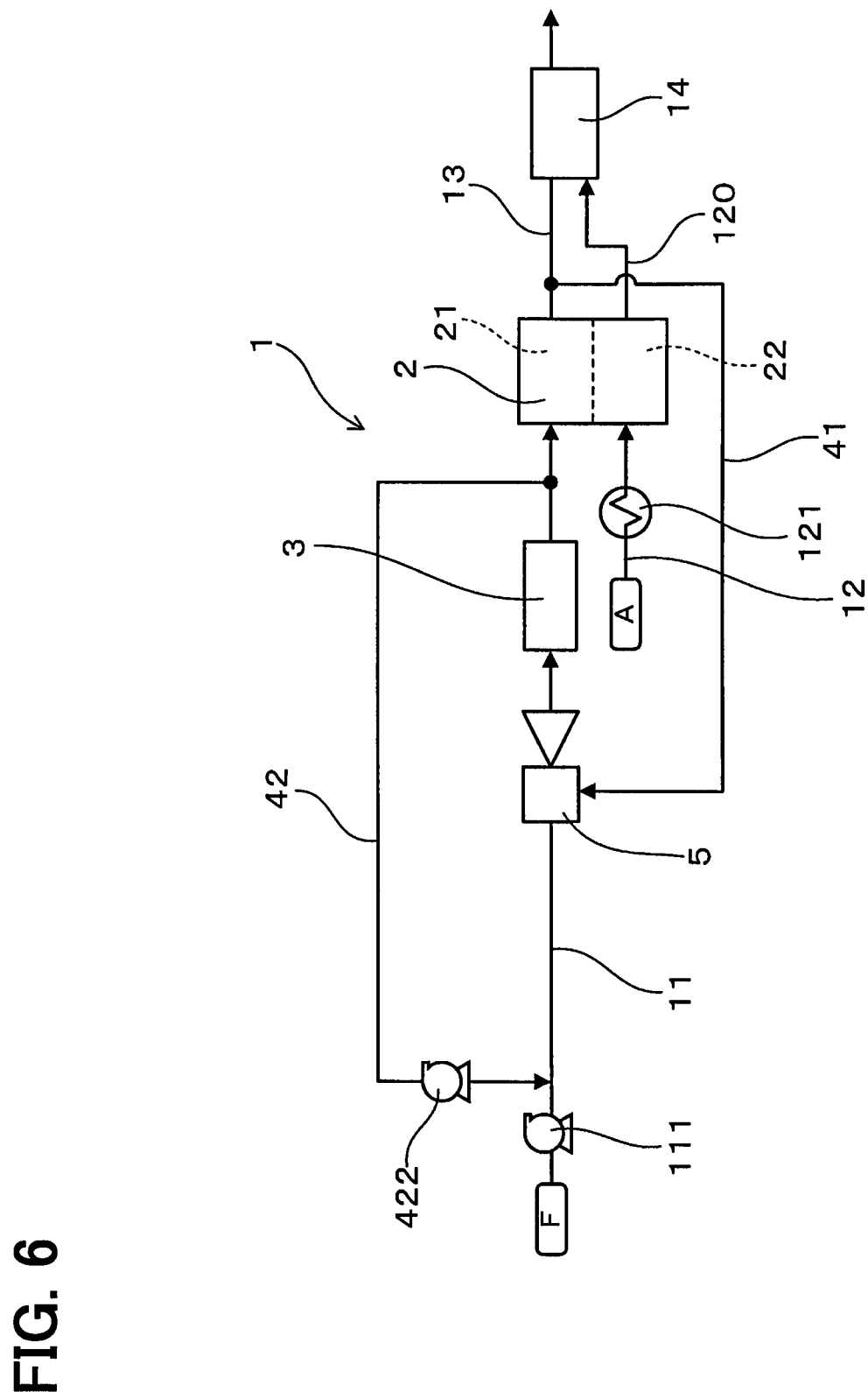
FIG. 6 is an explanatory diagram of a fuel cell system according to a sixth embodiment.

In the fuel cell system 1 of the sixth embodiment, as shown in FIG. 6, a blower is used as the flow rate control unit 422 in the second circulating line 42.

Further, the blower 111 in the fuel gas supply line 11 is disposed on the upstream side of the connection portion between the fuel supply line 11 and the second circulating line 42.

The other configuration is the same as that of the first embodiment.

In the sixth embodiment, the amount of circulation of the second circulating gas can be changed by controlling the number of rotations of the blower 422 provided in the second circulating line 42. Then, the second circulating gas and the fuel gas F in the raw fuel state are sent to the ejector 5 by the individual blowers 422 and 111, respectively. Therefore, the flow rate of the fuel gas in each of the blowers 422 and 111 can be reduced, and the miniaturization and cost reduction for each of the blowers 422 and 111 can be achieved.

In addition, the sixth embodiment has the same functions and advantages as in the first embodiment.

Seventh Embodiment

Figure 7:
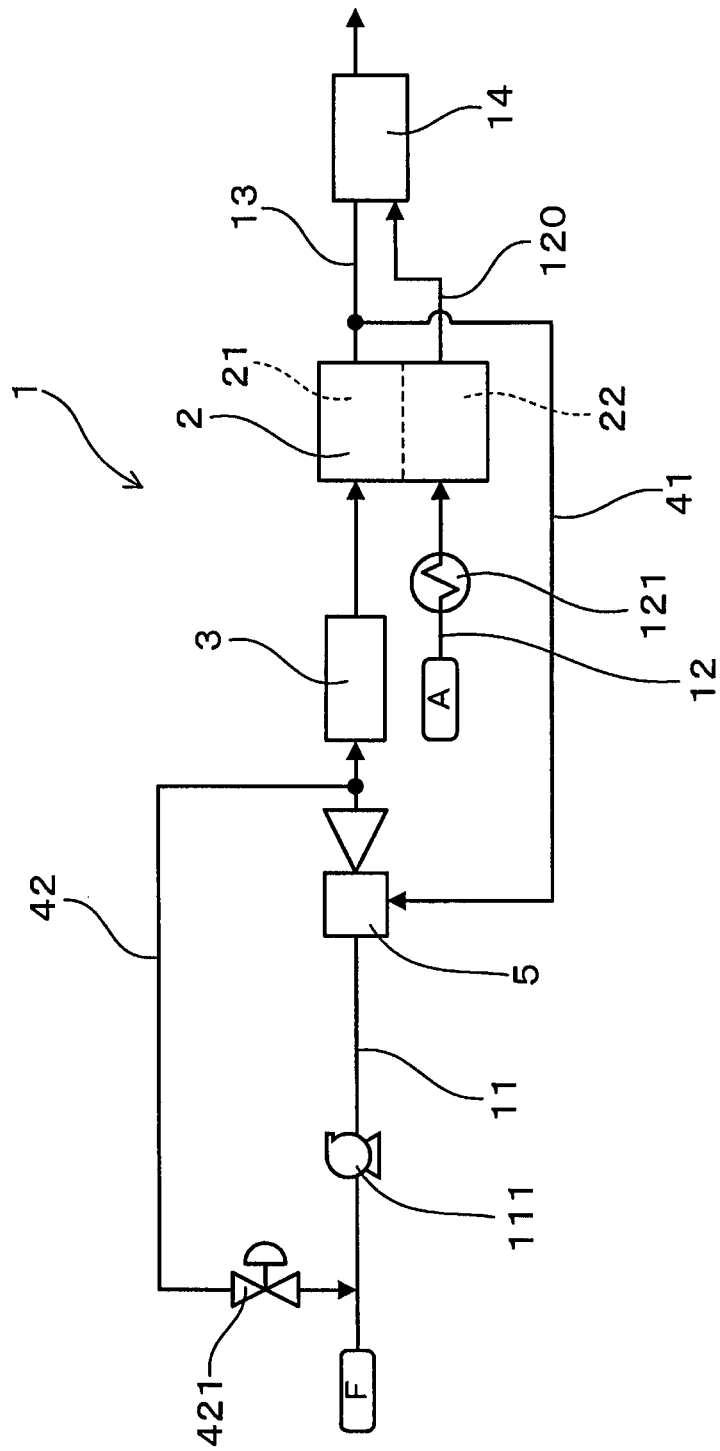
FIG. 7 is an explanatory diagram of a fuel cell system according to a seventh embodiment.

In the fuel cell system 1 of the seventh embodiment, as shown in FIG. 7, the second circulating line 42 is configured to circulate the fuel gas from the fuel gas supply line 11 between the ejector 5 and the reformer 3.

The other configuration is the same as that of the first embodiment.

In the present embodiment, fuel gas with low CO concentration before reforming is circulated. Therefore, the amount of CO to be removed from the second circulating gas can be reduced. That is, in practice, when the fuel gas is circulated to the upstream side of the blower 111, CO contained in the fuel gas is removed. For this purpose, a CO removal device (not shown) is provided in the second circulating line 42, however, the CO removal device can be miniaturized.

In addition, the seventh embodiment has the same functions and advantages as in the first embodiment.

Eighth Embodiment

Figure 8:
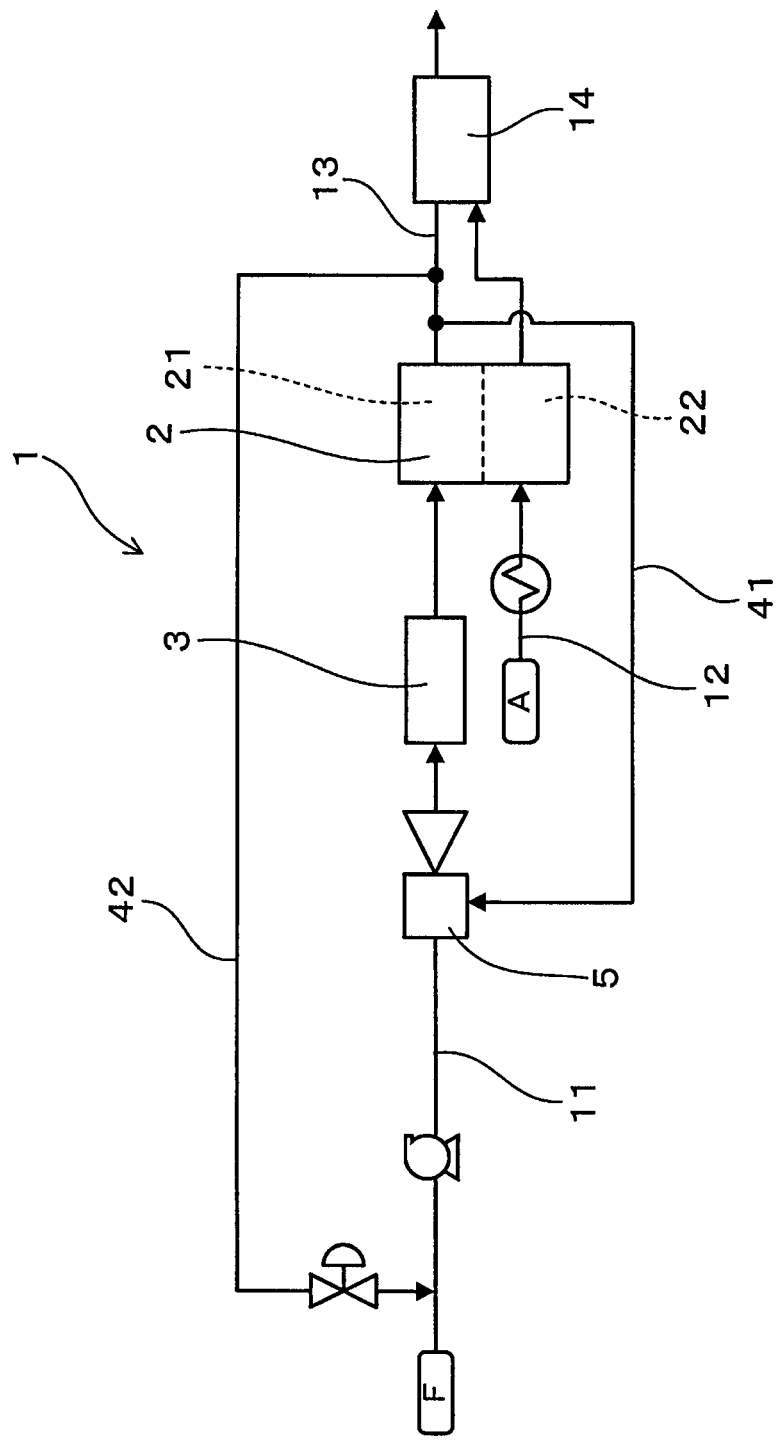
FIG. 8 is an explanatory diagram of a fuel cell system according to an eighth embodiment.

In the eighth embodiment, as shown in FIG. 8, the second circulating line 42 is configured to circulate the fuel gas from the fuel gas discharge line 13 in the fuel cell system 1.

That is, in the first to seventh embodiments, the second circulating line 42 is configured to circulate the fuel gas from the fuel gas supply line 11 between the ejector 5 and the fuel cell 2, however, the present disclosure is not limited to this configuration. Further, in the eighth embodiment, the second circulating line 42 is configured to circulate the fuel gas from the fuel gas discharge line 13 on the downstream side of the fuel cell 2.

The other configuration is the same as that of the first embodiment, and exhibits the same function and effect.

Ninth Embodiment

Figure 9:
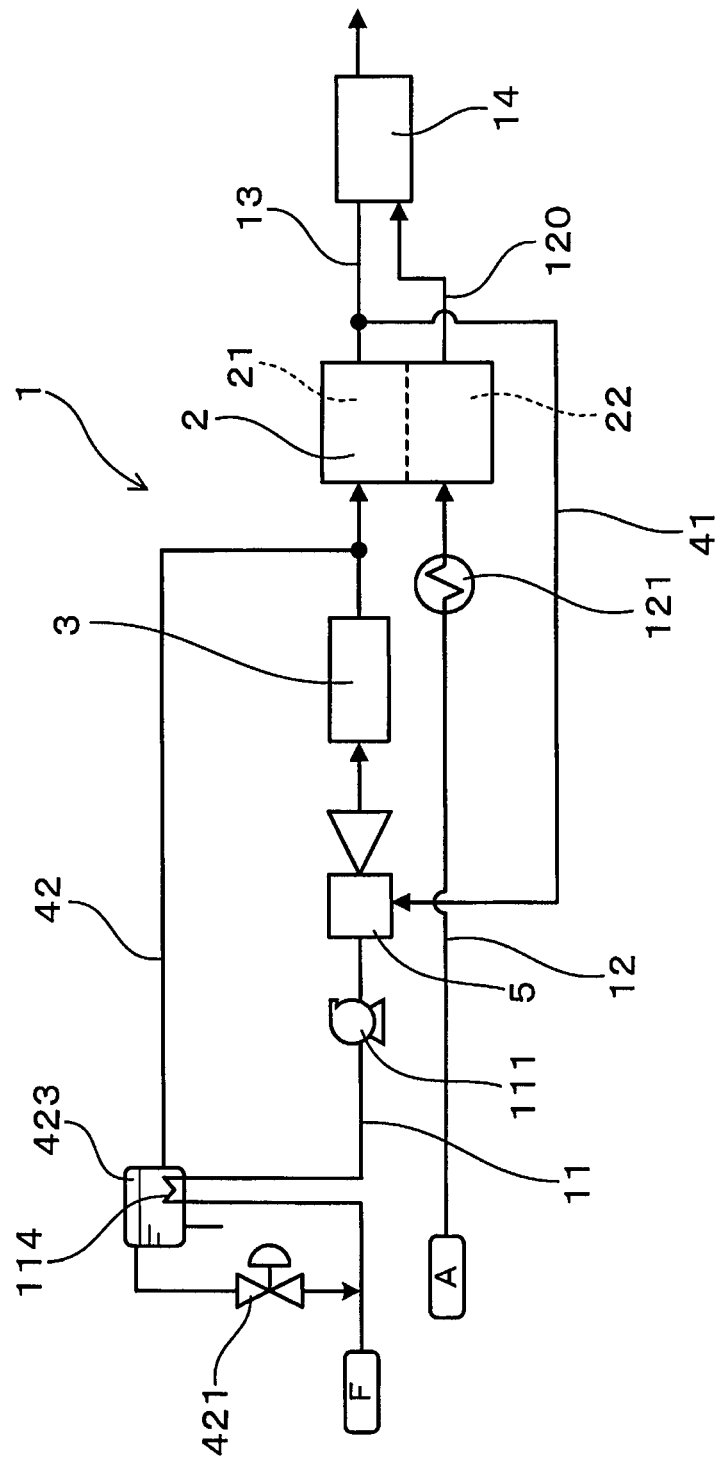
FIG. 9 is an explanatory diagram of a fuel cell system according to a ninth embodiment.

As shown in FIG. 9, the fuel cell system 1 of the ninth embodiment has an fuel heat exchange unit 114 between the condenser 423 and the fuel gas supply line 11.

The fuel heat exchange unit 114 is configured to be able to transfer the condensation heat generated in the condenser 423 to the fuel gas in the fuel gas supply line 11. That is, in the third embodiment, the oxidant heat exchange unit 122 is provided between the condenser 423 and the oxidizing agent gas supply line 12, but instead of this configuration, in the ninth embodiment, the fuel heat exchange unit 114 is provided.

In the ninth embodiment, the heat of condensation in the condenser 423 can be transferred to the fuel gas through the fuel heat exchange unit 114. Thereby, the fuel gas introduced into the ejector 5 can be volumetrically expanded. Therefore, it is possible to improve the volumetric flow rate of the fuel gas introduced into the ejector 5 as the driving flow, and improve the flow rate of the first circulating gas.

In addition, the ninth embodiment has the similar configurations and operation effects with in the first embodiment.

In addition, the third embodiment and the ninth embodiment are combined, so that both the oxidant heat exchange unit 122 and the fuel heat exchange unit 114 can be provided.

Tenth Embodiment

Figure 10:
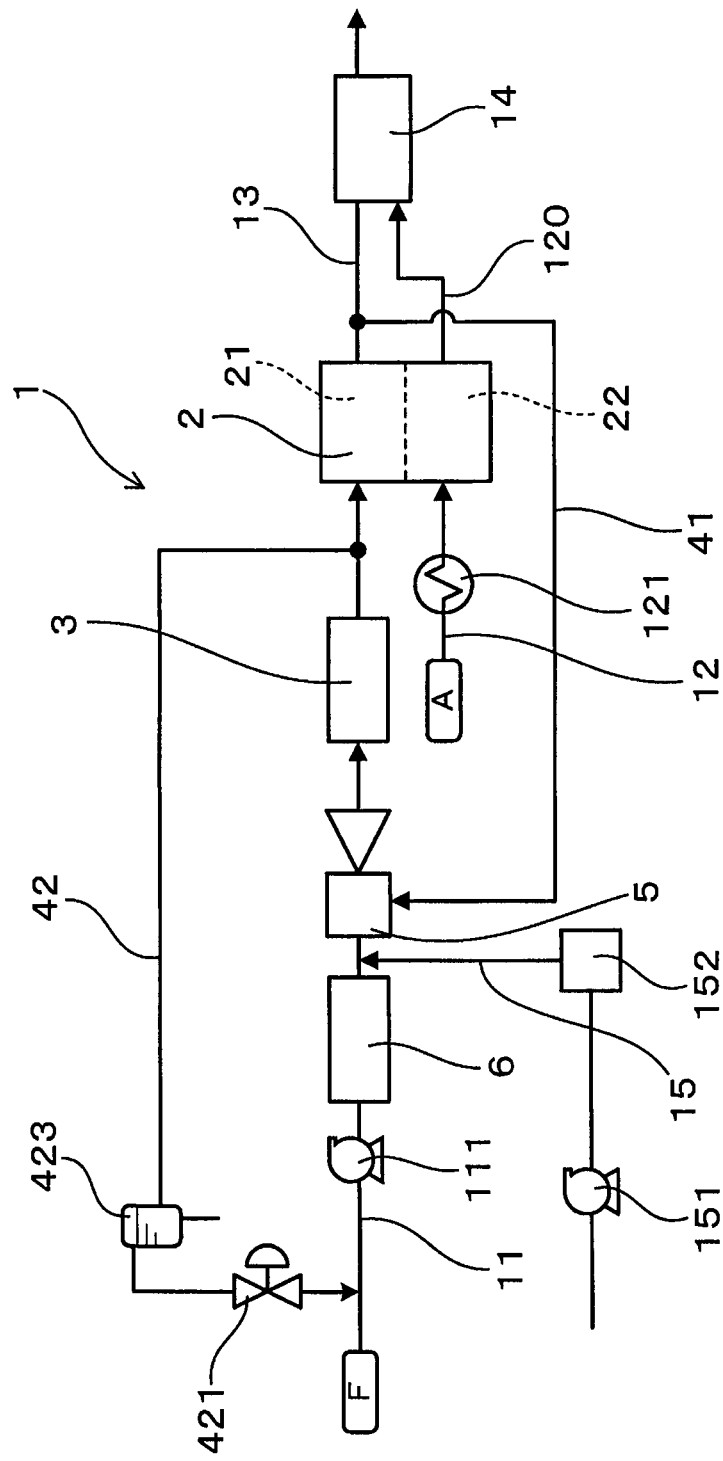
FIG. 10 is an explanatory diagram of a fuel cell system according to a tenth embodiment.

In the tenth embodiment, as shown in FIG. 10, the water vapor supply line 15 for supplying water vapor is connected to the fuel gas supply line 11 between a junction of the second circulating line 42 and the fuel gas supply line 11 and the ejector 5, in the fuel cell system 1.

The water vapor supply line 15 includes a water pump 151 for pumping liquid water and an evaporator 152 for evaporating water. Thus, the water vapor supply line 15 is configured to be able to supply the water vapor to the upstream side of the ejector 5 in the fuel gas supply line 11.

The fuel cell system 1 of the tenth embodiment has the water vapor supply line 15 in addition to the same basic configuration as the fuel cell system 1 of the fourth embodiment. The downstream end of the water vapor supply line 15 is connected to the fuel gas supply line 11 between the hydro-desulfurizer 6 and the ejector 5.

The other configuration is the same as that of the fourth embodiment.

In the tenth embodiment, the flow rate of the driving flow introduced from the fuel gas supply line 11 to the ejector 5 can be easily increased by the water vapor. That is, in addition to the increase of the driving flow by the merging of the second circulating gas from the second circulating line 42, the increase of the driving flow by the merging of the water vapor from the water vapor supply line 15 is enabled. Thereby, the suction flow in the ejector 5 can be increased, and the circulation rate of the first circulating gas can be increased.

In the tenth embodiment, the amount of water in the fuel gas in the fuel gas supply line 11 is increased. However, the fuel cell system 1 of the tenth embodiment includes the condenser 423 in the second circulating line 42. Thus, it is possible to adjust the amount of water in the fuel gas supply line 11. Therefore, it is possible to suppress excessive S/C (i.e., steam carbon ratio) in the fuel cell 2.

In addition, the tenth embodiment has the same functions and advantages as in the fourth embodiment.

Eleventh Embodiment

Figure 11:
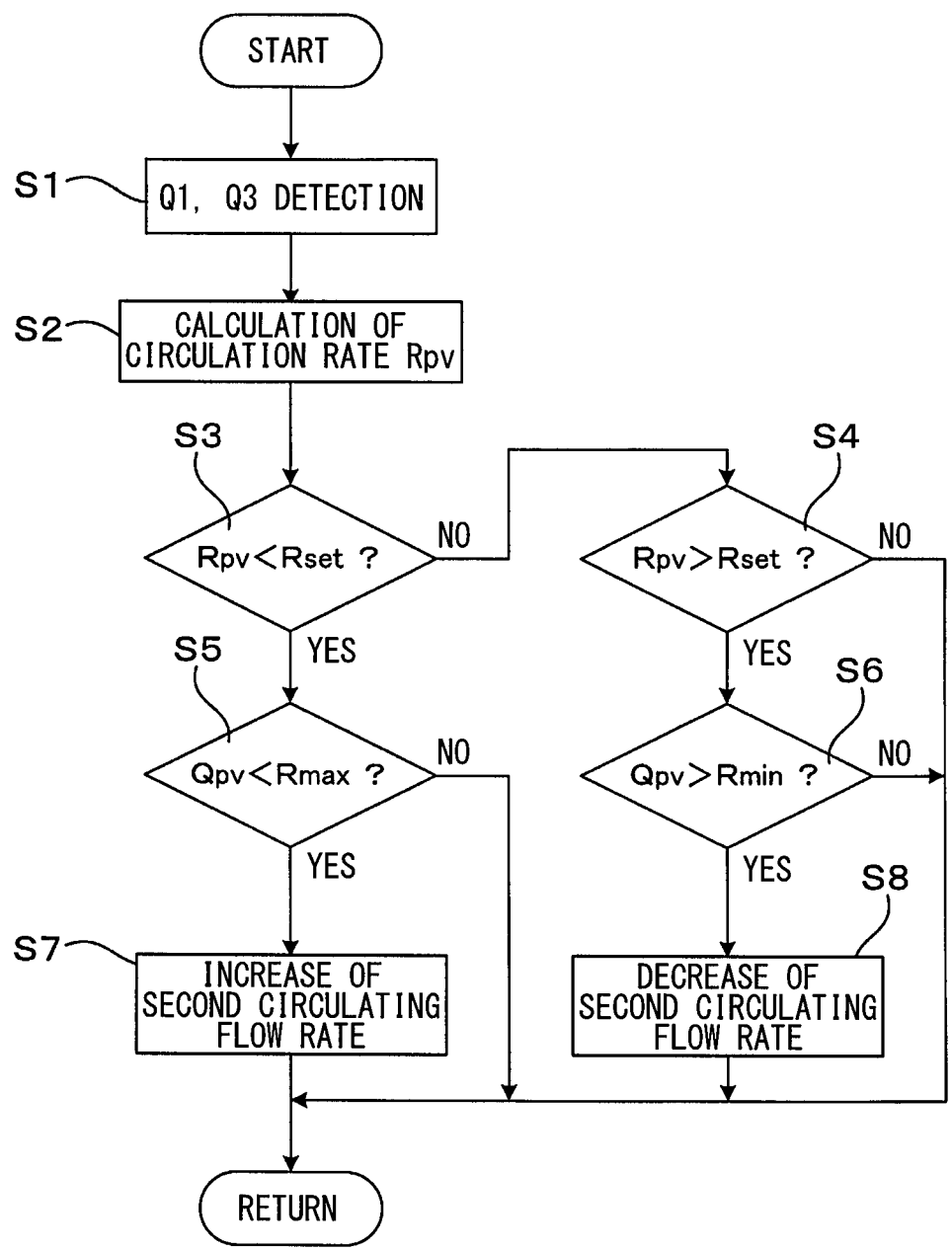
FIG. 11 is a control flow diagram of a fuel cell system according to an eleventh embodiment.

In the eleventh embodiment, as shown in FIG. 11, an embodiment of a flow control method of the second circulating gas by the flow rate control unit 421 is shown.

The fuel cell system 1 of the present embodiment has a first circulating flow rate detection unit and a second circulating flow rate detection unit.

The first circulating flow rate detection unit is a detection unit that detects the flow rate of the first circulating gas in the first circulating line 41.

The second circulating flow rate detection unit is a detection unit that detects the flow rate of the second circulating gas in the second circulating line 42.

The first circulating flow rate detection unit and the second circulating flow rate detection unit may be, for example, flow meters disposed in the first circulating line 41 and the second circulating line 42, respectively. However, the above detection units are not limited to these configurations, for example, the following configurations may be made.

That is, the first circulating flow rate detection unit may be configured to detect the flow rate of the first circulating gas based on the output voltage of the fuel cell 2. In this case, for example, it is possible to detect that the flow rate of the first circulating gas has decreased due to the decrease in the output voltage of the fuel cell 2. That is, when the flow rate of the first circulating gas decreases, the power generation reaction in the fuel cell 2 is reduced in accordance with the decrease, and the output voltage decreases. By using this relationship, the flow rate of the first circulating gas can be detected based on the output voltage of the fuel cell 2.

When the above configuration is adopted as the first circulating flow rate detection unit, a flow meter that withstands high temperatures is not particularly required, and it is possible to achieve cost reduction. That is, there is an advantage that it is not necessary to directly measure the flow rate of the high temperature first circulating gas discharged from the fuel cell 2, and in particular, it is not necessary to install an expensive flowmeter that can withstand high temperature. Then, the flow rate of the first circulating gas can be detected while detecting the output voltage of the fuel cell 2.

In addition, the first circulating flow rate detection unit may be configured to detect the flow rate of the first circulating gas based on the composition of the first circulating gas. For example, when the flow rate of the first circulating gas decreases, the proportions of H2 (hydrogen) and CO (carbon monoxide) in the first circulating gas increase, and the proportion of CO2 (carbon dioxide) in the first circulating gas decreases. The flow rate of the first circulating gas can be detected by detecting the composition of the first circulating gas by using this relationship.

When the above configuration is adopted as the first circulating flow rate detection unit, a flow meter that withstands high temperatures is not particularly required, and it is possible to achieve cost reduction.

Further, the first circulating flow rate detection unit may be configured to detect the flow rate of the first circulating gas based on the temperature of the burner in the combustor 14.

For example, when the flow rate of the first circulating gas decreases, the combustion in the combustor 14 is suppressed accordingly, and the temperature of the burner decreases. By using this relationship, the temperature of the burner is measured, and the flow rate of the first circulating gas can be detected based on the measured value (temperature).

When the above configuration is adopted as the first circulating flow rate detection unit, a flow meter that withstands high temperatures is not particularly required, and it is possible to achieve cost reduction. The flow rate of the first circulating gas can be detected, while detecting the temperature of the burner.

In addition, the second circulating flow rate detection unit may be configured to detect the flow rate of the second circulating gas based on the inlet pressure of the suction portion 52 of the circulation device (that is, the ejector 5). For example, when the flow rate of the second circulating gas decreases, the flow rate of the driving flow of the ejector 5 decreases accordingly, and the pressure of the suction portion 52 decreases. By using this relationship, the pressure of the suction portion 52 of the ejector 5 is detected, and the flow rate of the second circulating gas can be detected based on the detected value (pressure).

When this configuration is adopted as the second circulating flow rate detection unit, it is not necessary to provide a flow meter that directly detects the flow rate of the second circulating gas.

Further, the second circulating flow rate detection unit may be configured to detect the flow rate of the second circulating gas based on the temperature of the fuel gas at the outlet of the reformer 3. For example, when the flow rate of the second circulating gas decreases, the flow rate of the fuel gas passing through the reformer 3 decreases, and the temperature of the reformer 3 rises accordingly. By using this relationship, the temperature of the reformer 3 is measured, and the flow rate of the second circulating gas can be detected based on the measured temperature.

When this configuration is adopted as the second circulating flow rate detection unit, calculation of the reforming rate in the reformer 3 is also performed using the measured temperature of the fuel gas at the outlet of the reformer 3. That is, based on the detection value of the temperature sensor provided at the outlet of the reformer 3, it is possible to detect the flow rate of the second circulating gas together with the reforming rate.

The first circulating flow detection unit and the second circulating flow detection unit are not limited to the above described configurations, and other configurations are also available as the detection units. For example, it is also possible to detect the flow rate of the first circulating gas based on the temperature of the first circulating line by using the relationship that the temperature of the first circulating line 41 decreases when the flow rate of the first circulating gas decreases.

Further, the fuel cell system 1 of the present embodiment further includes a discharge amount detection unit that detects the flow rate of the fuel gas discharged from the anode flow channel 21.

For example, the following detection unit can be used as the discharge amount detection unit.

That is, the discharge amount detection unit may be configured to detect the mass flow rate or volume flow rate of the gas in the fuel gas discharge line 13 by, for example, a flow meter provided in the fuel gas discharge line 13.

Further, the discharge amount detection unit estimates the discharge amount of the fuel gas from the anode flow channel 21 based on, for example, the flow rate of the fuel gas in the fuel gas supply line 11 and the transfer amount of oxygen from the cathode to the anode in the fuel cell 2. The transfer amount of oxygen from the cathode to the anode can be calculated from the current value when the fuel cell 2 is generating electricity.

In the fuel cell system 1 of the present embodiment, as shown in FIG. 11, the flow rate of the second circulating gas is adjusted in the flow rate control unit 421, based on the first detection flow rate by the first circulating flow rate detection unit, the second detection flow rate by the second circulating flow rate detection unit, and the detection discharge amount by the discharge amount detection unit.

In the following, this control method will be described with reference to a flow chart of FIG. 11. First, in step S1, the first circulating flow rate detection unit detects the first circulating flow rate, and the discharge amount detection unit detects the discharge amount of the fuel gas from the anode flow channel 21.

Next, in step S2, the circulation rate Rpv of the first circulating gas is calculated based on the first detection flow rate Q1 by the first circulating flow rate detection unit and the detection discharge amount Q3 by the discharge amount detection unit. Here, the circulation rate Rpv is calculated by a following formula.

$Rpv=Q1/Q3.$

The circulation rate Rpv calculated in step S2 is compared with the target circulation rate Rset in steps S3 and S4. Here, the target circulation rate Rset is a preset target circulation rate, and has a predetermined width. That is, in step S3, it is determined whether the circulation rate Rpv is less than the lower limit value of the target circulation rate Rset. In step S4, it is determined whether the circulation rate Rpv exceeds the upper limit value of the target circulation rate Rset.

In step S3, it is determined whether or not the circulation rate Rpv is less than the target circulation rate Rset. If the determination is No in step S3, the process proceeds to step S4. In step S4, it is determined whether the circulation rate Rpv exceeds the target circulation rate Rset.

When it is determined in step S3 that the circulation rate Rpv is less than the target circulation rate Rset, the process proceeds to step S5. When it is determined in step S4 that the circulation rate Rpv exceeds the target circulation rate Rset, the process proceeds to step S6. In step S5, the second detection flow rate Q2 detected by the second circulating flow rate detection unit is compared with the upper limit value Qmax of the flow rate. In step S6, the second detection flow rate Q2 is compared with the lower limit value Qmin of the flow rate. Here, the flow rate upper limit value Qmax and the flow rate lower limit value Qmin are predetermined allowable values of the flow rate of the second circulating gas, and for example, are set based on the control limit of the flow rate control unit 421, the heat exchange performance of the condenser 423, etc.

In step S5, it is determined whether the second detection flow rate Q2 is less than the flow rate upper limit value Qmax, and in step S6, it is determined whether the second detection flow rate Q2 exceeds the flow rate lower limit value Qmin.

That is, in steps S3 to S8, when the circulation rate Rpv is less than the target circulation rate Rset, the second circulating flow rate is increased on the condition that the second detection flow rate Q2 is less than the flow rate upper limit value Qmax. The second circulating flow rate is reduced on the condition that the circulation rate Rpv exceeds the target circulation rate Rset, and the second detection flow rate Q2 exceeds the flow rate lower limit value Qmin.

If the circulation rate Rpv is within the range of the target circulation rate Rset, the second circulating flow rate is not changed. Further, even when the circulation rate Rpv is not within the range of the target circulating rate Rset, the second circulating flow rate is not increased when the second detection flow rate Q2 exceeds the flow rate upper limit value Qmax. Even if the circulation rate Rpv is not within the range of the target circulating rate Rset, the second circulating flow rate is not reduced when the second detection flow rate Q2 is lower than the flow rate lower limit value Qmin.

As described above, by controlling the second circulating flow rate, the circulation rate of the first circulating gas can be appropriately controlled. Also, this control flow can be repeatedly executed as appropriate at predetermined time intervals and timing.

The remaining configurations and operation are the same as those of the first embodiment.

The present disclosure is not limited to the respective embodiments described above, and various modifications may be adopted within the scope of the present disclosure without departing from the spirit of the disclosure. In addition, the first circulating flow rate detection unit 411 shown in the first embodiment (see FIG. 1) and the water content detection unit 113 shown in the second embodiment (see FIG. 2) may be appropriately adopted in other embodiments.

Although the present disclosure has been described in accordance with the embodiment, it is understood that the present disclosure is not limited to the embodiment and the structure. The present disclosure encompasses various modifications and variations within the scope of equivalents. In addition, various combinations and configurations, as well as other combinations and configurations that include only one element, more, or less, fall within the scope and spirit of the present disclosure.

In order to improve the efficiency of the fuel cell system, a technology for circulating fuel gas has been proposed. For example, in the fuel cell system disclosed in JP 2013-235735 A, the water vapor contained in the unused fuel gas discharged from the fuel cell is condensed by the condenser and stored in the condenser. On the other hand, an ejector evacuates the fuel gas for recycling from which water vapor has been removed and circulates it to the fuel gas supply line. Further, the condensed water stored in the condenser is joined by a pump to the fuel gas supply line on the upstream side of the ejector through a water line for circulating. Thus, the mass flow rate of the driving flow flowing to the ejector is adjusted so that the circulation rate of the fuel gas can be made close to the target circulation rate.

In the assumable fuel cell system, condensed water is circulated to the fuel gas supply line through the water line for circulating. Therefore, it is not only necessary to provide a pump for pumping the condensed water for circulating in the circulating water line, but also to provide an evaporator in the circulating water line for vaporizing the condensed water again to be used for increasing the driving flow. Therefore, there is room for improvement in terms of simplification of the system and improvement of the energy efficiency of the entire system.

The present disclosure aims to provide a fuel cell system capable of simplifying the system and improving power generation efficiency.

In one aspect of the present disclosure, a fuel cell system includes a fuel cell having an anode flow channel and a cathode flow channel, a fuel gas supply line configured to supply a fuel gas to the anode flow channel, and an oxidizing agent gas supply line configured to supply a oxidizing agent gas to the cathode flow channel, a fuel gas discharge line through which the fuel gas discharged from the anode flow channel flows, and a reformer provided in the fuel gas supply line to reform the fuel gas. A first circulating line is configured to circulate the fuel gas from the fuel gas discharge line to an upstream side of the reformer in the fuel gas supply line as a first circulating gas. A circulation device is provided in the fuel gas supply line and is configured to suction the first circulating gas by using the flow of the fuel gas flowing through the fuel gas supply line as a driving flow. A second circulating line is configured to circulate the fuel gas from a downstream side of the circulation device in the fuel gas supply line or the fuel gas discharge line to the upstream side of the circulation device in the fuel gas supply line as a second circulating gas.

The fuel cell system has a first circulating line and a second circulating line. The second circulating line can circulate the fuel gas on the downstream side than the circulation device as the second circulating gas, and merge with the upstream side than the circulation device in the fuel gas supply line. Thereby, the mass flow rate of the fuel gas sent to the circulation device as the driving flow can be increased. As a result, it is possible to increase the amount of the first circulating gas that is sucked into the circulation device as the suction flow.

On the other hand, the second circulating gas circulating in the second circulating line circulates in the form of gas and is joined to the upstream side of the circulation device. Therefore, it is not necessary to provide an evaporator etc. in the second circulating line especially, and the energy for evaporation is not required in particular. As a result, it is possible to simplify the system and improve the power generation efficiency.

As described above, according to the present embodiment, it is possible to provide a fuel cell system capable of simplifying the system and improving the power generation efficiency.

The invention claimed is:

1. A fuel cell system, comprising:
a fuel cell having an anode flow channel and a cathode flow channel;
a fuel gas supply line configured to supply a fuel gas to the anode flow channel;
an oxidizing agent gas supply line configured to supply an oxidizing agent gas to the cathode flow channel;
a fuel gas discharge line through which the fuel gas discharged from the anode flow channel flows;
a reformer provided in the fuel gas supply line so as to reform the fuel gas;
a circulation device provided in the fuel gas supply line and being configured to suction a first circulating gas by using the flow of the fuel gas flowing through the fuel gas supply line as a driving flow;
a first circulating line configured to circulate the fuel gas from the fuel gas discharge line directly to the circulation device as the first circulating gas; and
a second circulating line configured to circulate the fuel gas from the fuel gas supply line between the reformer and the fuel cell to the upstream side of the circulation device in the fuel gas supply line as a second circulating gas.

2. The fuel cell system according to claim 1, wherein
a flow rate control unit that controls a flow rate of the second circulating gas is provided in the second circulating line.

3. The fuel cell system according to claim 1, further comprising:
a first circulating flow rate detector configured to detect the flow rate of the first circulating gas in the first circulating line.

4. The fuel cell system according to claim 2, further comprising
a first circulation flow rate detection unit provided in the first circulating line that detects the flow rate of the first circulating gas, wherein
an opening degree of the flow rate control unit is adjusted based on the flow rate of the first circulating gas detected by the first circulation flow rate detection unit.

5. The fuel cell system according to claim 2, wherein
an opening degree of the flow rate control unit is adjusted based on an amount of power generation.

\* \* \* \* \*